(12) United States Patent
Carscadden

(10) Patent No.: US 7,676,896 B1
(45) Date of Patent: Mar. 16, 2010

(54) BRAKE SPRING TOOL

(76) Inventor: James R. Carscadden, 217 W. 27$^{th}$ St., San Bernardino, CA (US) 92405

( * ) Notice: Subject to any disclaimer, the term of this patent is extended or adjusted under 35 U.S.C. 154(b) by 517 days.

(21) Appl. No.: 11/636,860

(22) Filed: Dec. 11, 2006

Related U.S. Application Data

(60) Provisional application No. 60/760,513, filed on Jan. 18, 2006.

(51) Int. Cl.
*B25B 27/30* (2006.01)
(52) U.S. Cl. .............. 29/227; 29/270; 29/278; 254/25
(58) Field of Classification Search ............ 29/227, 29/278, 270; 254/25; 362/119–120
See application file for complete search history.

(56) References Cited

U.S. PATENT DOCUMENTS

| 949,337 | A | * | 2/1910 | Trogner ............... 254/25 |
| 2,830,480 | A | * | 4/1958 | Brame ............... 81/176.15 |
| D256,442 | S | * | 8/1980 | Martin ............... D10/77 |
| 4,870,737 | A | | 10/1989 | Navarro |
| 5,003,680 | A | | 4/1991 | Vesely et al. |
| 5,095,603 | A | | 3/1992 | Carruthers et al. |
| 5,455,996 | A | | 10/1995 | Ploeger et al. |
| 5,732,456 | A | | 3/1998 | Frey |
| 5,964,517 | A | * | 10/1999 | Adams ............... 362/119 |
| 6,108,882 | A | | 8/2000 | Hodgson |
| 6,332,379 | B1 | * | 12/2001 | Klomp ............... 81/60 |
| 6,386,727 | B1 | * | 5/2002 | Yeh ............... 362/119 |
| 7,066,615 | B2 | * | 6/2006 | Diggle et al. ............... 362/120 |
| 7,069,842 | B1 | * | 7/2006 | Liao ............... 99/421 A |
| 7,195,567 | B2 | * | 3/2007 | Lu ............... 473/300 |
| 2002/0105796 | A1 | * | 8/2002 | Naghi et al. ............... 362/120 |
| 2004/0026940 | A1 | * | 2/2004 | Kahler et al. ............... 294/7 |
| 2006/0196057 | A1 | * | 9/2006 | So ............... 30/322 |

* cited by examiner

*Primary Examiner*—Lee D Wilson
(74) *Attorney, Agent, or Firm*—Kenneth L Tolar

(57) ABSTRACT

A tool for assisting a worker in removing and reattaching brake springs includes an elongated shaft having an upper end and a lower end. Axially extending from the upper end is a tapered neck with a flattened stem extending therefrom. At a distal end of the stem is a C-shaped gripping member for grasping a brake spring. By holding the shaft, a worker can secure the C-shaped gripping member about the spring. The S-cam can be used as a fulcrum for the shaft, allowing the spring to be expanded as necessary for removal or attachment. The shaft may also include a light for illuminating dimly lit work areas.

7 Claims, 2 Drawing Sheets

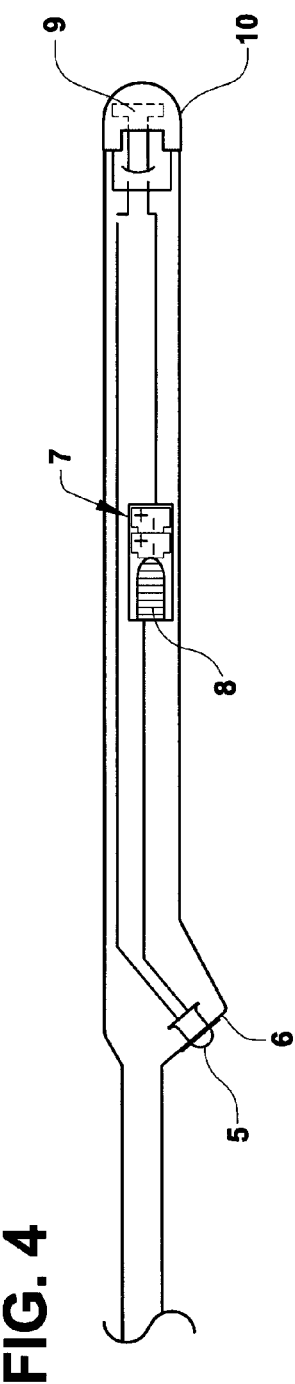
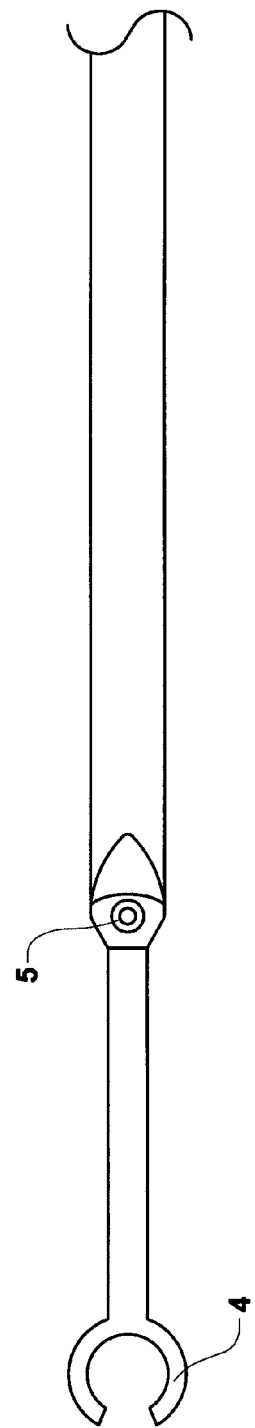

BRAKE SPRING TOOL

CROSS REFERENCE TO RELATED APPLICATIONS

This application is entitled to the benefit of provisional application No. 60/760,513 filed on Jan. 18, 2006, the specification of which is incorporated herein by reference.

BACKGROUND OF THE INVENTION

The present invention relates to a uniquely designed tool for assisting a worker in removing and installing brake shoes on heavy-duty, commercial vehicles.

DESCRIPTION OF THE PRIOR ART

Heavy-duty vehicles equipped with break shoes typically have S-cam return springs, which must be removed and reattached when replacing the brake shoes. Currently, the springs are removed and attached with pliers or other conventional household tools that easily dislodge from the spring, allowing it to uncontrollably collapse and seriously injure a worker.

A review of the prior art reveals a myriad of tools that are purportedly designed to address this problem. For example, U.S. Pat. No. 5,095,603 issued to Carruthers et al. discloses a drum brake service tool and method including a lever having a pair of arms at an end thereof for receiving a brake spring. The brake spring is positioned between the arms and the lever is pivoted on the brake cam to extend the spring to a fastening pin on a brake shoe.

U.S. Pat. No. 5,003,680 issued to Vesely et al. discloses a tool for removing brake shoe return springs including a slender bar having a distal portion that is tapered in two dimensions with a hook extending therefrom. A pair of draw hooks are pivotally attached to the bar for securing to a brake spring. The hook at the distal end of the bar grips an internal hub when the bar is used as a fulcrum.

U.S. Pat. No. 4,870,737 issued to Navarro discloses a brake spring removal tool including laterally extending spurs for engaging the coiled portion of the spring during installation and removal.

U.S. Pat. No. 6,108,882 issued to Hodgson discloses a brake spring tool including a handle with a bent shaft extending therefrom. A distal end of the shaft includes a tip with a C-shaped gap formed thereon for retaining a spring.

U.S. Pat. No. 5,455,996 issued to Ploeger at al. discloses a brake spring tool including a shaft having a slotted collar at a distal end.

U.S. Pat. No. 5,732,456 issued to Frey discloses a brake shoe spring tool including a handle with a multidirectional shaft extending therefrom. A distal end of the shaft is flat for more easily engaging an axle. A spike is positioned on an intermediate portion of the shaft for engaging the brake spring.

Accordingly, there is currently a need for a tool that allows a worker to more safely and easily remove and attach S-cam return springs. The present invention addresses this need by providing an elongate, tapered tool having a C-shaped gripping member at a distal end for securely gripping the spring.

SUMMARY OF THE INVENTION

The present invention relates to a tool for assisting a worker in removing and reattaching brake springs including an elongated shaft having an upper end and a lower end. Axially extending from the upper end is a tapered neck with a flattened stem extending therefrom. At a distal end of the stem is a C-shaped gripping member for grasping a brake spring. A light is positioned on the shaft immediately adjacent the tapered neck for assisting a worker when using the tool in dimly lit areas. By holding the shaft, a worker can secure the C-shaped gripping member about the spring. The S-cam can be used as a fulcrum for the shaft, allowing the spring to be expanded as necessary for removal or attachment.

It is therefore an object of the present invention to provide a tool that minimizes the danger and inconvenience associated with installing and removing brake springs.

It is another object of the present invention to provide a brake spring tool that allows a worker to quickly and securely grip a brake spring.

Other objects, features, and advantages of the present invention will become readily apparent from the following detailed description of the preferred embodiment when considered with the attached drawings and the appended claims.

BRIEF DESCRIPTION OF THE DRAWINGS

FIG. 4 is a side, sectional view of the tool depicting the light means and associated components.

FIG. 5 is a bottom view of the tool and light means depicted in FIG. 4.

DESCRIPTION OF THE PREFERRED EMBODIMENT

Figure 1:
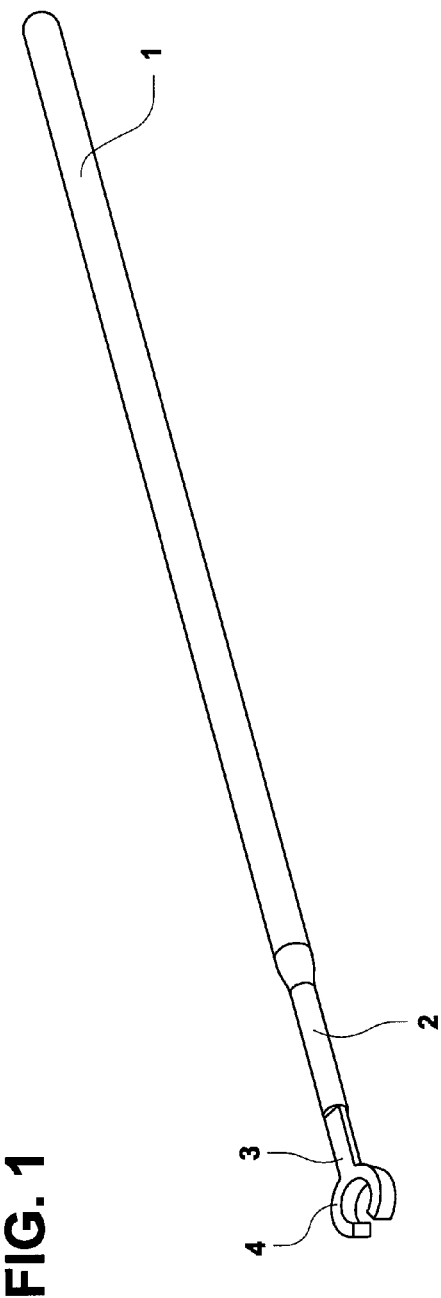
FIG. 1 is a perspective view of the brake spring tool according to the present invention.
Figure 2:
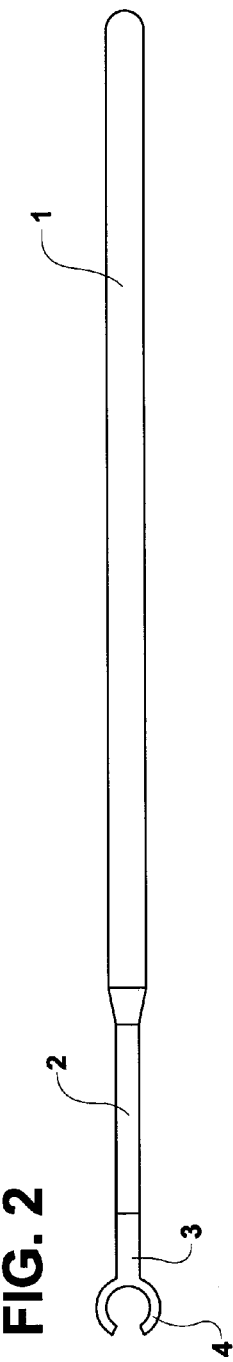
FIG. 2 is a front, plan view of the tool.
Figure 3:
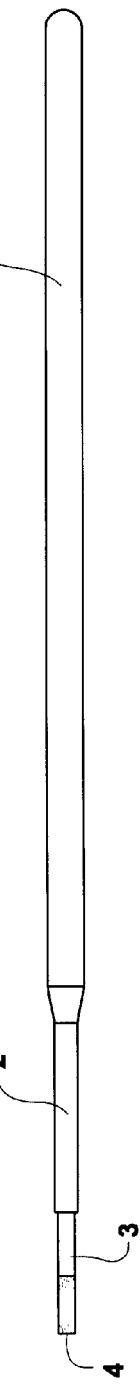
FIG. 3 is a side, plan view of the tool.

The present invention relates to a brake spring tool. The device comprises an elongated shaft 1 having an upper end and a lower end with an elongated, tapered neck 2 axially extending from the upper end. At a distal end of the neck is a narrow, flattened stem 3 with a C-shaped gripping member 4 attached thereto. The tapered neck and flattened stem allow the gripping member to be maneuvered within the confined spaces that typically surround an S-cam. Preferably, the entire tool is encapsulated with a fluorescent green outer layer so that it is readily visible within a toolbox or when lying on a shop floor.

Now referring to FIGS. 4 and 5, the tool preferably includes a light means for assisting a worker with using the tool in dimly lit areas. The light means includes an LED 5 positioned within a cavity 6 on the shaft, immediately adjacent the tapered neck. Preferably, the LED extends at a slight angle relative to the shaft to project light both axially and perpendicularly relative thereto. Batteries 7 and associated ground springs 8 are positioned within a compartment on the shaft, which are in selective communication with the LED via a depressible switch 9. The switch protrudes from the lower end of the shaft and is enclosed with a removable cover 10.

To use the above described device, a worker extends the C-shaped gripping member to grasp the lower end of the shoe return spring. By using the S-cam as a fulcrum for the shaft, a worker can stretch the spring with minimal effort and maximum control. The spring can then be easily stretched as is necessary for attachment or release. If light is needed, the worker simply depresses the switch to activate the LED.

The above described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A brake spring tool comprising:
   an elongated shaft having an upper end and a lower end;
   an elongated, tapered neck axially extending from the upper end of said shaft;
   a narrow, flattened stem at a distal end of said neck;
   a C-shaped gripping member attached to said stem and coplanar therewith.

2. The brake spring tool according to claim 1 wherein the tapered neck, the shaft and the flattened stem are entirely encapsulated with a fluorescent colored outer layer so that said tool is readily visible in dimly lit areas.

3. The brake spring tool according to claim 2 further comprising a light means for assisting a worker with using the tool in dimly lit areas.

4. The brake spring tool according to claim 3 wherein said light means includes an LED positioned within a cavity formed on said shaft, immediately adjacent the flattened stem.

5. The brake spring tool according to claim 4 wherein said LED extends at a slight angle relative to the shaft to project light both axially and perpendicularly relative thereto.

6. The brake spring tool according to claim 5 wherein said LED is activated with a depressible switch protruding from the lower end of the shaft.

7. The brake spring tool according to claim 6 wherein said switch is enclosed with a removable cover.

* * * * *